June 14, 1955  E. D. RAPISARDA  2,710,678
TRAY-SUPPORTING STRUCTURE FOR BUBBLE TOWERS
Filed Sept. 15, 1950  3 Sheets-Sheet 1

INVENTOR
EDWARD D. RAPISARDA
BY Chapin & Neal
ATTORNEYS

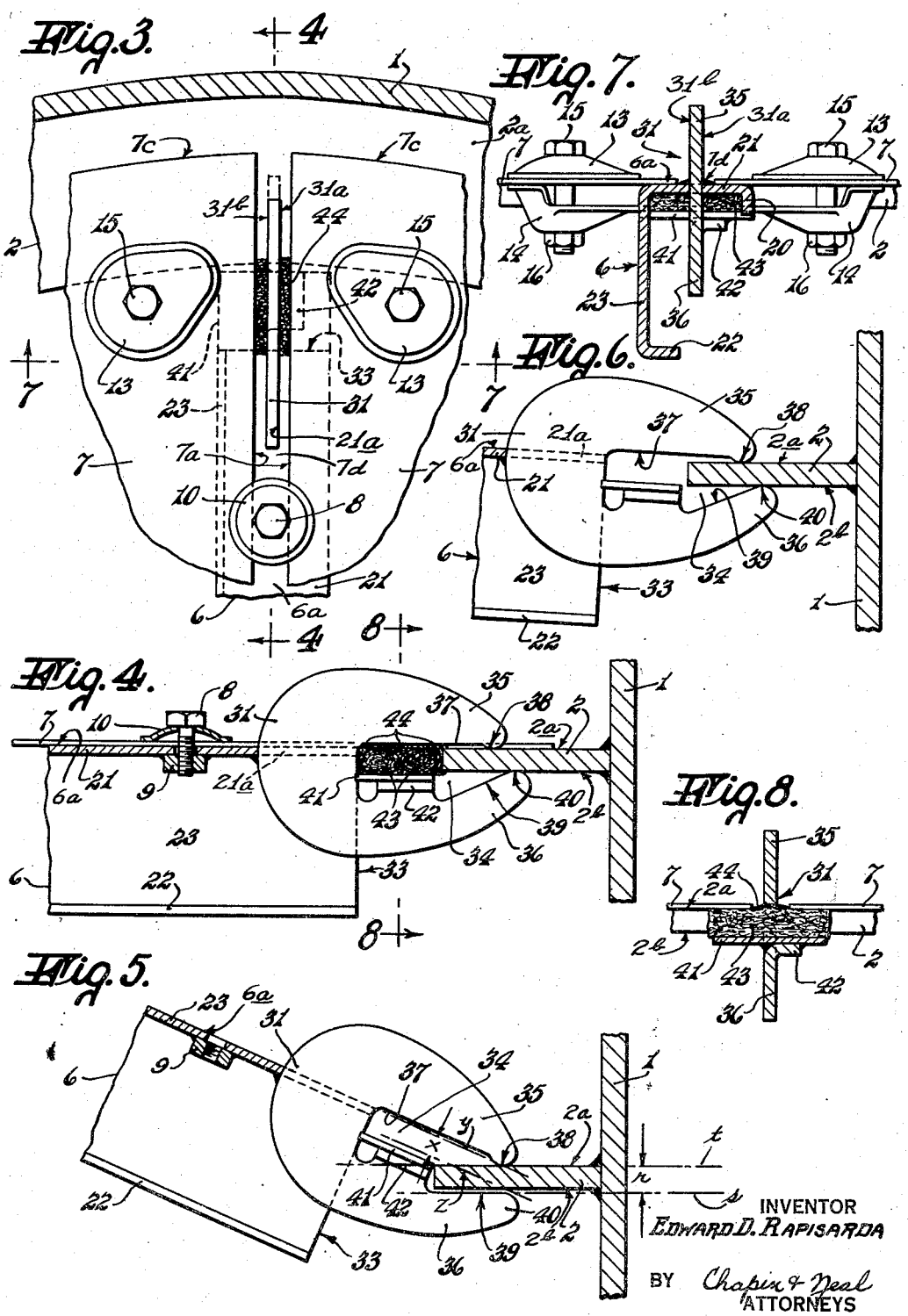

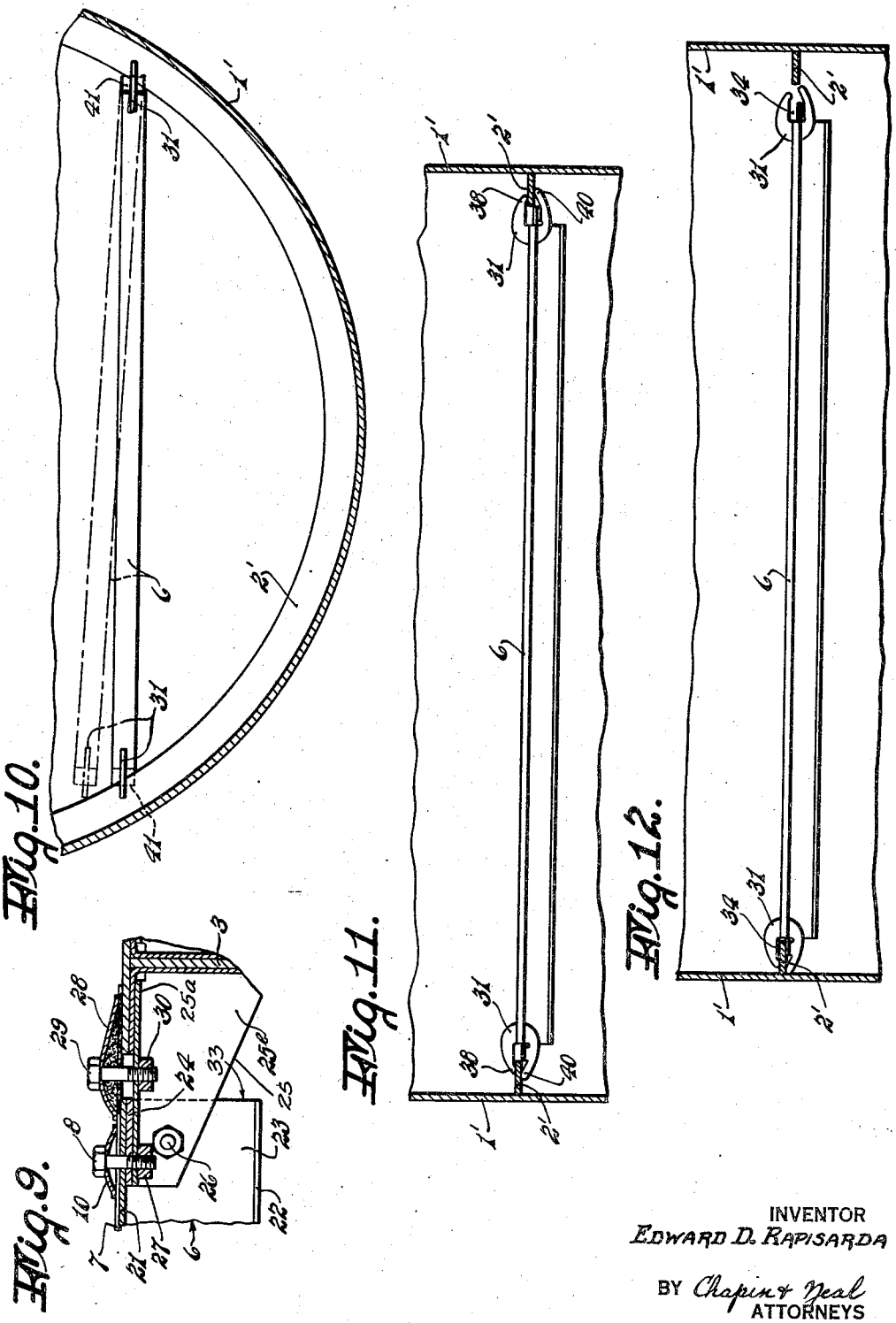

United States Patent Office 2,710,678
Patented June 14, 1955

2,710,678

TRAY-SUPPORTING STRUCTURE FOR BUBBLE TOWERS

Edward D. Rapisarda, Agawam, Mass., assignor to Gilbert & Barker Manufacturing Company, West Springfield, Mass., a corporation of Massachusetts Application September 15, 1950, Serial No. 185,017

3 Claims. (Cl. 189—34)

This invention relates to an improved sectional tray construction for refining towers, such as bubble towers or the like.

The tray-supporting structure of a refining tower usually includes a series of parallel beams supported at their outer ends from a substantially annular ring welded to the peripheral wall of the tower and at their inner ends from a truss, which spans the tower and is supported at its ends therefrom. In some cases, where the tower is of relatively small diameter, the truss is omitted and the beams are connected at both ends to the annular tower ring. The deck or floor of the tray is formed by thin plates, the side edges of which rest on the beams and the end edges of which rest on the support and truss. All these parts are usually made of corrosion-resisting metal, such as stainless steel, for example, which is relatively expensive, and hence the construction must be made as light as possible for economy in material. The floor plates, beams, trusses, and fastening devices are made with precision methods in a factory and shipped to the site of the tower to be assembled in the tower after it has been erected. The annular rings are usually welded in the tower during its erection. The trusses, beams and plates are passed through manholes in the wall of the tower and assembled by a workman inside the tower. The connection of parts to the tower rings is made difficult because the tower is generally out of round. If ordinary fastenings, such as bolts are used, the holes in the tower ring have to be drilled in the field in order to insure a good fit and this is inconvenient and expensive.

This invention has for an object the provision of an improved fastening device which can be applied quickly and conveniently to a support, such as the tower ring of a bubble tower, without the use of screws or bolts and without requiring close accuracy in the tower ring.

The invention has for a particular object the provision of a gripping device, fixed to an end of a tray-supporting beam of a bubble tower, or the like, and having an interference fit with the ring of the tower so that the gripping device has to be deformed, when forced in place on the ring, and thereby becomes bound to the latter.

The invention has for another object the provision in a bubble tower of beams, each supported by gripping devices, which are thin plate-like parts vertically-disposed relative to the load-supporting surface of the beam and projecting beyond the ends of the beam to rest like trunnions on the tower ring, so that, when the floor plates of the tray are applied to the beams, the beams may turn enough under the load of the plates to level the load-supporting faces of the beams and brings such faces and the plates into a common plane.

These and other objects will best be understood from the following description of an illustrative example of the invention in the accompanying drawings, in which:

Fig. 3 is a fragmentary plan view drawn to a larger scale and showing in detail the novel connection between the end of a beam and the tower ring;

Fig. 4 is a sectional view taken on the line 4—4 of Fig. 3;

Figs. 5 and 6 are views taken similarly to Fig. 4 but respectively showing the parts as they are positioned at the start and near the end of the assembly operation;

Fig. 7 is a cross sectional view taken on the line 7—7 of Fig. 3;

Fig. 8 is a cross sectional view taken on the line 8—8 of Fig. 4;

Fig. 9 is a sectional view taken on the line 9—9 of Fig. 2;

Fig. 10 is a small-scale fragmentary sectional plan view of another refining tower with which the invention may be used in another manner;

Fig. 11 is a fragmentary central sectional elevational view of the tower shown in Fig. 10; and Fig. 12 is a view taken similarly to Fig. 11 and illustrating the manner of mounting a diametrically extending beam on the tower ring.

Figure 1:
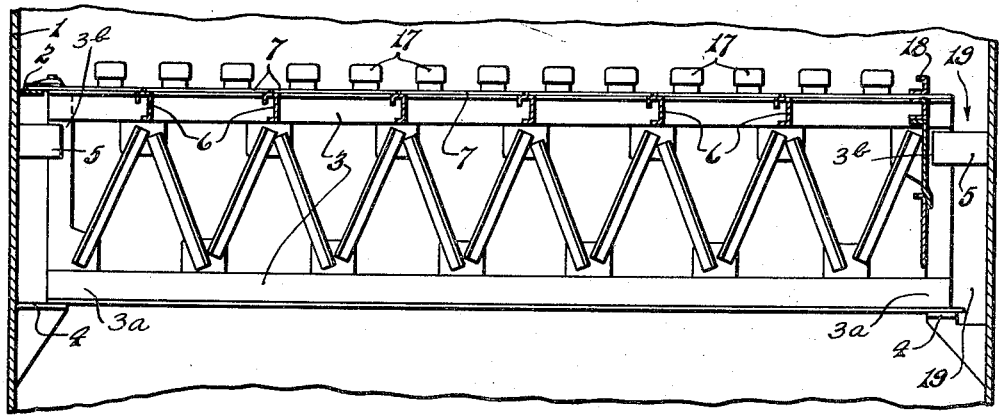
Fig. 1 is a small-scale sectional elevational view of a refining tower showing the improved tray construction.
Figure 2:
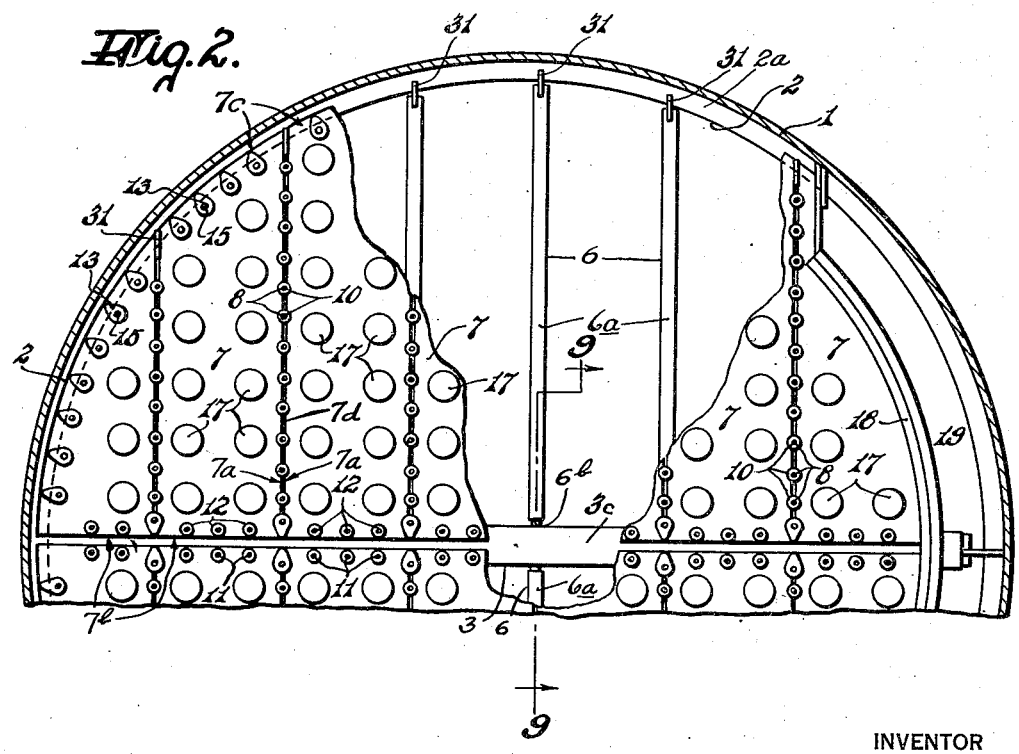
Fig. 2 is a sectional plan view thereof.

Referring to these drawings: there is shown in Figs. 1 and 2, by way of illustrative example, a portion of a bubble tower as an upstanding cylindrical shell 1. Suitably secured to the peripheral wall of the tower is a substantially annular ring 2, which extends around the greater part but not all of the wall, as indicated in Fig. 2, and has a flat, level, upper, floor-supporting face 2a. Spanning the tower diametrically is a truss 3, the ends 3a of which are supported one on each of two seats 4, suitably fixed to the tower wall, and are connected near the top 3b of the truss one to each of two plates 5 suitably secured to the tower wall. The upper face 3c of the truss 3 is flat and in the same horizontal plane as upper face 2a of ring 2. Extending from truss 3 to ring 2 are a series of spaced parallel beams 6, the upper and load-supporting faces 6a of which are flat and located in said plane. Floor plates 7 have their side edges 7a resting on the beams 6, their inner end edges 7b on the truss 3 and their outer end edges 7c on ring 2. The two edges 7a of successive floor plates rest on one beam 6 and are in spaced parallel relation. In the space 7d between these edges 7a are a series of screws 8, each of which threads into the underlying beam, or a nut 9 secured thereto, and by means of a washer 10 presses the edges 7a of the plates 7 against the flat upper face 6a of the beam, frictionally holding them in place. The detail of this fastening is shown in Fig. 4. Other screws 11 and washers 12 hold the inner end edge 7b of each floor plate to the upper face 3c of the truss. The curved edges 7c of the plates, which rest on tower ring 2, are held thereto by clamps having upper and lower members 13 and 14, respectively, and a screw 15, threading into a nut 16 in the lower member, for drawing the members together, as shown in detail in Fig. 7. The floor plates 7 carry suitable bubble caps 17. Each tray includes a weir 18 over which liquid overflows and passes through a downcomer 19 to another and underlying tray, not shown. There are in the bubble tower a plurality of trays, such as described, arranged at different levels but it is unnecessary for an understanding of the present invention to describe more than one of these trays.

Each beam 6 is of modified angle iron shape as best shown in Fig. 7, having a short vertical web 20 downturned from one edge of its horizontal leg 21, and a short horizontal web 22 inturned from the lower edge of its vertical leg 23. The inner end 6b of this beam is secured to the truss 3 as shown in Fig. 9. The horizontal leg 21 of the beam rests on a spacer 24 mounted on top of the horizontal leg 25a of an angle iron 25, suitably fixed to truss 3, and the vertical leg 23 is secured to a vertical leg 25b of the angle iron by a bolt 26. Fig. 9 also shows the inner end bolt 8' of a series threading into a nut 27 welded to angle iron 25 and a special sealing washer 28, which is held in place by a screw 29 threading into a nut 30, welded to angle iron 25. This washer 28 prevents leakage through the space between the edges of two floor plates 7 and between the inner end of beam 6 and the adjacent side of truss 3.

The present invention provides a novel gripping claw (shown in detail in Figs. 3 to 8) on the outer end of a beam 6 for connecting such end to the tower ring 2 without the use of clamps and bolts and nuts and in a manner requiring no tools other than possibly a hammer, as will later appear. This gripping claw is made of a thin plate 31 set into a central, longitudinally-extending slot 21a in the end of the horizontal leg 21 of beam 6 and fixed thereto in any suitable way, as for example by welding. The plate has its faces 31a and 31b at right angles to the upper face 6a of the leg 21 of beam 6 and extends in part above said member in the space 7d between the adjacent edges 7a of two floor plates 7, and in part below said member. The plate projects a substantial distance beyond the outer end 33 of beam 6 and has a slot 34 which extends from its outer end inwardly as far as the end 33 of the beam and divides the plate into upper and lower portions or claws 35 and 36, respectively. The upper wall 37 of slot 34 is substantially horizontal and terminates with a bearing portion 38 which rests on the upper face 2a of the tower ring 2 and lies in the same horizontal plane as the load-supporting face 6a of beam 6. The wall 37 does not normally engage the ring. The slot 34 has a portion 39 of its lower wall diverging inwardly with relation to the load-supporting face 6a of beam 6 and at the outer end of this portion is a bearing portion 40, which is located farther from the end 33 of beam 6 than bearing portion 38 and which presses upwardly against the lower face 2b of the tower ring 2 and binds the plate thereto. The distance X (see Fig. 5) between the horizontal plane y in which the upper and load-supporting surface 6a of beam 6 and the bearing portion 38 are located, and a parallel plane z which is tangent to the lower bearing portion 40, is less than the thickness of the tower ring 2. On the other hand, the distance r between a plane s which touches the ends of the wall 39 of slot 34 and is tangent to bearing portion 40, and a parallel plane t which is tangent to the bearing portion 38, is greater than the thickness of the tower ring. In mounting the beam 6, its inner end 6b is raised, as shown in Fig. 5, at an inclination to the horizontal such that the lower wall 39 of slot 34 is horizontal, or substantially so, and the gripper on the end of the beam is thrust toward the ring 2, the claws 35 and 36 freely passing respectively above and below the tower ring 2. Then, the inner end of the beam is lowered with the upper bearing portion 38 as a fulcrum. When the beam nears a horizontal position, such as shown in Fig. 6, the lower bearing portion 40 will have engaged the lower face of ring 2. Further downward movement of the beam 6 into the horizontal position shown in Fig. 4 will cause the lower part 36, which is weaker than the upper part 35, to be deformed slightly and the lower bearing portion 40 to press against the lower face 2b of the tower ring 2 sufficiently to hold the gripper and ring tightly together. In lowering the inner end 6b of the beam, it will be swung to one side of angle iron 25 sufficiently to allow the web 22 to pass the top of the angle iron and then swung back to overlie the angle and finally lowered on top of the latter. The inner end 6b of the beam is then bolted to the angle iron 25. If the outer end 33 of the beam 6 is not positioned at the right location, it can be driven to the right or left, as required, by striking the upstanding claw 35 of the gripper with a hammer.

The slot 34 is preferably extended beyond the inner end of the diverging wall 39 and up to the end 33 of beam 6 as shown. The additional length of the slot enables assembly of the beam in certain locations, where assembly would otherwise not be possible and compensates for changes in angularity of the ring with respect to the end of the beam, as will later be described, and also enables provision to be made for effectively sealing the space between the end 33 of the beam 6 and the tower ring 2 and the adjacent edges of the floor plates 7. For the sealing purpose, a plate 41 is suitably fixed, as by welding, to a lug 42, which is bent outwardly from the claw 36 at right angles. The upper face of the plate 41 normally lies horizontally in a plane slightly below that in which the lower face of tower ring 2 is located. The plate 41 is as long as the beam 6 is wide and it is wide enough to extend from the end 33 of the beam substantially to the ring 2 in the example shown in which the beam lies radially of the ring. At other locations, part of the plate 41 will underlie the tower ring (see Fig. 10). Plate 41 is adapted to carry suitable packing material, such as the two short lengths of braided asbestos 43 and the loose asbestos twisted rope 44, superposed on the braided asbestos. This packing material is laid in place on plate 41 before the floor plates 7 are applied. These plates, as shown in Fig. 3, overlie the greater part of the packing material and, when the plates are clamped in place by the screws 8 and the screws 15 with their clamps 16 and 17, the packing will be tightly compressed between the floor plates 7 and plate 41 and against both side faces of plate 31.

In some towers, such as that shown at 1' in Figs. 10 and 11, there is no need of a central truss, such as 3, and the beams have both their ends supported on the tower ring 2'. Both ends of each beam 6 will then be provided with gripping claws 31, such as heretofore described. In mounting these beams in the tower, the procedure for all but the central diametrical beam, is to connect one end of the beam to ring 2' in the manner above described, lower the beam into horizontal position while inclined slightly to the final position desired, as indicated in dot-dash lines in Fig. 10, in order to allow the outer end of the gripper to clear ring 2', and then while the slot 34 in the gripper is aligned with ring 2' driving the gripper sidewise until it is engaged with the ring and the beam is in its proper position, such as shown by full lines in Fig. 10. In the case of diametrical beam 6, the gripper at one end is applied to ring 2', while the beam is held in upwardly inclined position with the gripper positioned as shown in Fig. 5, then lowered until it is nearly horizontal and the gripper on the other end is located in the position shown in Fig. 6, then the first-named gripper is driven further onto the ring 2' until the latter engages the end of slot 34, which allows the second-named gripper to clear the tower ring and be positioned as shown in Fig. 12, and then the beam is moved to the right to drive the second-named gripper onto the tower ring into the position shown in Fig. 11. The grippers may be driven by a hammer blow applied to the rear part which upstands from the beam. Of course, where the gripper is driven on sidewise or endwise, the slot 34 need not necessarily have its lower wall diverging inwardly as above described.

As will be clear from the foregoing description, the gripper has what may be called an interference fit with the tower ring to which it is to be applied. The space between the plane of the load-supporting surface of beam 6 and a parallel plane tangent to the lower bearing portion 40 is less than the thickness of the tower ring. Thus, the gripper must be deformed in the act of applying it to the tower ring and this may be done as last described by driving the gripper sidewise as in Fig. 10 or lengthwise as in Fig. 12 by means of a hammer, which bends the longer lower jaw downwardly. Or the gripper may be deformed as first above described by using the beam as a lever to bend the lower jaw of the gripper from the Fig. 6 to the Fig. 4 position. In case the gripper does not become bound tightly enough to the tower ring, the lower jaw may be bent with a hammer blow to narrow the space between the two bearing portions.

The invention provides a device which can be used to fasten the beams to any suitable support but which is especially useful for fastening the beams to the tower ring of a bubble tower or the like. These towers are generally somewhat out of round. Hence, if bolts were used to fasten the beams in place, the holes would have to be drilled in the ring while the latter is in place in the tower to insure a good fit and this work is tedious and costly. The present invention enables the beam to be fastened in a simple but effective manner without regard to whether the ring is truly round or not. And the fastening can be effected without the use of wrenches or any other tool, except in some cases a hammer. The gripper effects the connection with a single part, which may be punched out and welded in place, as distinguished from clamps in which two members are drawn together by a bolt or screw.

The invention thus provides an improved fastening device for the purpose described which can be manufactured at low cost and which can be applied quickly and easily regardless of the inaccuracies in the support, thus substantially reducing the cost of assembly.

What is claimed is:

1. In combination, a floor beam having a flat load-supporting surface, and a support-gripping claw fixed to said beam near one end thereof and projecting beyond such end in a direction longitudinally of the beam, said claw having a slot extending from its outer end inwardly toward said end of the beam and dividing it into upper and lower portions respectively adapted to overlie and underlie a support to be gripped; said upper portion terminating with a bearing portion projecting downwardly from the upper wall of said slot located outwardly beyond said end of the beam in the same plane as said surface and adapted to engage the upper face of a support as a fulcrum; said lower portion having a bearing portion projecting upwardly from the lower wall of said slot and located outwardly beyond said end of the beam a greater distance than said first-named bearing portion, the downward force due to the weight of the beam tending to swing the beam and attached claw about said fulcrum and adapted to move said lower portion to thrust the second-named bearing portion upwardly against the lower face of a support.

2. In combination, a floor beam having a flat load-supporting surface, and a support-gripping claw fixed to said beam and projecting outwardly beyond one end thereof in a direction longitudinally of the beam, said claw having a slot extending from its outer end inwardly toward said end of the beam and dividing the claw into upper and lower portions respectively adapted to overlie and underlie a support to be gripped, the upper wall of said slot having at its outer end a curved bearing portion the lowest part of which is located tangent to the plane in which said surface is located and adapted to engage the upper face of a support, the lower wall of the slot having at its outer end a curved bearing portion located a greater distance beyond said end of the beam than the first-named bearing portion and adapted to engage the lower face of a support, the highest part of said last-named bearing portion being tangent to a plane parallel with but below the first-named plane, a portion of the lower wall of said slot extending inwardly from its bearing portion toward said end of the beam in diverging relation to said planes, the straight line distance between the lines of tangency of the bearing portions with their respective planes being greater than the shortest distance between such planes.

3. In a floor construction, the combination with two longitudinally-spaced flat horizonally-disposed supporting members, of a plurality of beams each extending longitudinally between said members and each having a flat load-supporting surface located in the same horizontal plane as the upper face of each member, each beam having its ends spaced from the adjacent members, claws fixed one to each end of each beam and projecting beyond the ends of the same for connecting the latter to said members, each claw being longitudinally slotted and straddling the adjacent supporting member with an upper part resting on the upper face of such member to support the beam therefrom and a lower part directly underlying the upper part and such member and pressing upwardly against the lower face of such member to frictionally grip it between said upper and lower parts, the upper parts of both claws on each beam having flat vertically-disposed side faces and each side face of one such part being located in the same vertical plane as the corresponding side face of the other such part, the two vertical planes in which the side faces of each upper part are located being equally spaced from and on opposite sides of a vertical plane passing centrally through the beam, each said lower part having side faces located in the same two vertical planes as the corresponding side faces of the upper part, and floor plates respectively supported along their side edges and end edges on the upper faces of said beams and members, the contact area of said upper and lower parts with a member being of much less width than the load-supporting face of the beam to which they are fixed and facilitating turning of the beams to bring their load supporting faces and the lower faces of the floor plates into a common plane.

References Cited in the file of this patent

UNITED STATES PATENTS

| | | |
|---|---|---|
| 635,122 | Bremer | Oct. 17, 1899 |
| 662,228 | Escher | Nov. 20, 1900 |
| 1,326,802 | Strathern | Dec. 30, 1919 |
| 2,079,240 | Bruns | May 4, 1937 |
| 2,375,409 | Glitsch | May 8, 1945 |
| 2,403,842 | Bates | July 9, 1946 |
| 2,491,726 | Glitsch | Dec. 20, 1949 |
| 2,540,781 | Glitsch | Feb. 6, 1951 |
| 2,542,289 | Robbins | Feb. 20, 1951 |
| 2,544,614 | Rapisarda | Mar. 6, 1951 |

FOREIGN PATENTS

| | | |
|---|---|---|
| 226,942 | Great Britain | 1925 |